United States Patent
Madwed

[19]

[11] Patent Number: 6,109,379
[45] Date of Patent: Aug. 29, 2000

[54] INDEPENDENTLY PIVOTABLE DRIVEWHEEL FOR A WHEELED CHASSIS

[76] Inventor: Albert Madwed, 110 Wedgewood Dr., Easton, Conn. 06612

[21] Appl. No.: 09/121,243

[22] Filed: Jul. 23, 1998

Related U.S. Application Data

[60] Provisional application No. 60/053,738, Jul. 25, 1997.

[51] Int. Cl.$^7$ .................................................. B60K 1/00
[52] U.S. Cl. ........................ 180/65.5; 180/252; 180/253
[58] Field of Search .................... 180/65.5, 252, 180/253, 907, 13, 209, 411

[56] References Cited

U.S. PATENT DOCUMENTS

| | | | |
|---|---|---|---|
| 3,075,603 | 1/1963 | Baudhuin ................................. | 180/253 |
| 3,337,231 | 8/1967 | Drake ...................................... | 180/253 |
| 3,443,655 | 5/1969 | Beck et al. .............................. | 180/253 |
| 3,506,080 | 4/1970 | Hott et al. ............................... | 180/253 |
| 3,572,458 | 3/1971 | Tax . | |
| 3,912,037 | 10/1975 | Krieg . | |
| 3,972,379 | 8/1976 | Norris . | |
| 3,998,288 | 12/1976 | Aoki ....................................... | 180/253 |
| 4,219,094 | 8/1980 | Sturgill ................................... | 180/253 |
| 4,427,089 | 1/1984 | Peterson . | |
| 4,444,287 | 4/1984 | Voelz . | |
| 4,463,821 | 8/1984 | Falamuk ................................. | 180/252 |
| 4,483,405 | 11/1984 | Noda et al. . | |
| 4,613,009 | 9/1986 | Nakamura et al. ..................... | 180/253 |
| 4,683,973 | 8/1987 | Honjo et al. ............................ | 180/252 |
| 5,295,553 | 3/1994 | Morita et al. ........................... | 180/253 |
| 5,547,038 | 8/1996 | Madwed . | |
| 5,609,220 | 3/1997 | Moriya et al. .......................... | 180/253 |
| 5,699,873 | 12/1997 | Moriya et al. .......................... | 180/402 |
| 5,901,805 | 5/1999 | Murakami et al. ..................... | 180/168 |
| 5,924,512 | 7/1999 | Wada ...................................... | 180/253 |

*Primary Examiner*—Eric Culbreth
*Assistant Examiner*—L. Lum
*Attorney, Agent, or Firm*—Cohen, Pontani, Lieberman & Pavane

[57] ABSTRACT

A drivewheel assembly is connectable between a frame of a wheeled chassis and a drivewheel, and provides powered rotation for operatively moving the frame and chassis in a user-controllable direction along an underlying supporting surface and for selectively reorienting the drivewheel to change the direction of movement of the frame and chassis along the supporting surface. A motor connected to the drivewheel and operable to rotate the drivewheel is mounted to the frame for pivotal rotation relative to the frame about an orienting axis substantially perpendicular to the drivewheel axis of rotation. In a first operating mode of the drivewheel assembly the motor is coupled to the frame so as to prevent pivotal rotation of the motor about the orienting axis and maintain the current orientation of the drivewheel, whereby operation of the motor to rotate the drivewheel causes the frame and chassis to move along the supporting surface in a direction determined by the current orientation of the drivewheel. In a second operating mode of the drivewheel assembly the motor is decoupled from the frame so as to permit pivotal rotation of the motor about the orienting axis, whereby operation of the motor to rotate the drivewheel causes the motor to pivotally rotate about the orienting axis and thereby effects reorientation of the drivewheel for movement of the frame and chassis in a different direction determined by the reoriented drivewheel.

19 Claims, 9 Drawing Sheets

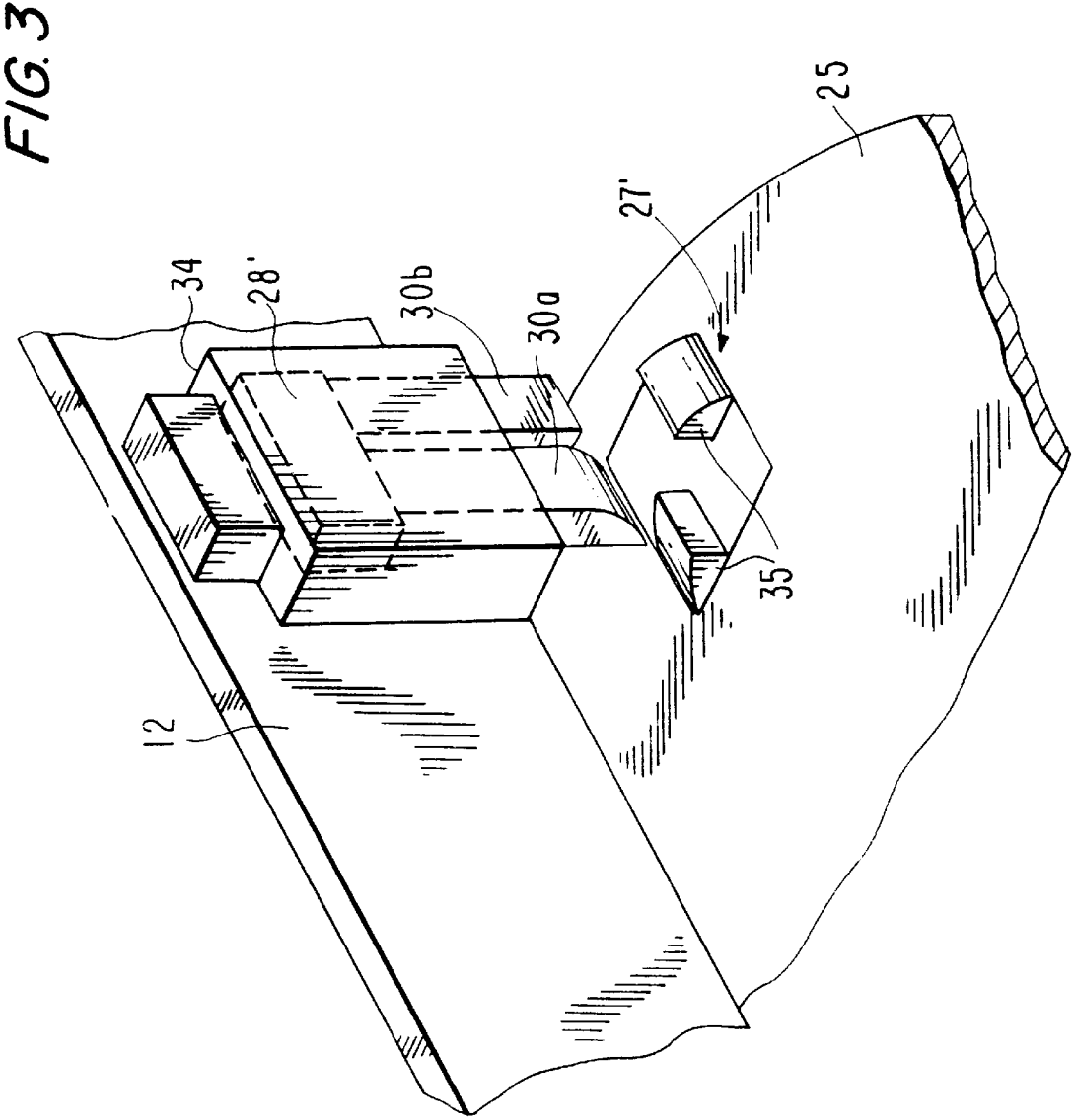

INDEPENDENTLY PIVOTABLE DRIVEWHEEL FOR A WHEELED CHASSIS

RELATED APPLICATIONS

This application claims priority from provisional application No. 60/053,738, filed Jul. 25, 1997 the entire disclosure of which is expressly incorporated herein by reference.

FIELD OF THE INVENTION

The present invention relates to drive wheels for a motorized wheeled chassis, particularly to independently pivotable drivewheels mounted at two corners of a generally rectangular chassis equipped with a controller for pivoting and driving each of the drivewheels to enable omnidirectional travel of the wheeled chassis.

BACKGROUND OF THE INVENTION

A conventional motorized wheelchair is typically equipped with a chassis having front wheels implemented by a pair of free-spinning casters and rear wheels in the form of a pair of motor operated wheels which are fixed to the chassis and are frequently driven independently of one another by reversible, variable-speed DC motors. In such wheelchairs, the rotative direction and speed of each of the right and left motor-operated wheels are varied by reversing the power source connection to the appropriate DC drive motor and by regulating the input voltage to the motor, which actions result respectively in switching of the direction of movement of the wheelchair (between forward and backward travel) and changing the speed (rpm) of movement of the wheelchair on or along an underlying ground surface. In this manner, a conventional motorized wheelchair is fairly easily advanced, retreated, turned to the right or to the left, and turned around in a stopped state.

Traditional steering assemblies for wheelchairs typically provide either a centralized steering device having transmission members attached to the drivewheels for controlled cooperation between the drivewheels, or individual steering devices attached to each individual drivewheel. An example of the former is U.S. Pat. No. 4,483,405 to Noda et al. which discloses two drivewheels linked to a central steering unit that simultaneously pivots the drivewheels about substantially vertical axes. In this type of arrangement, only simultaneous movement of the drivewheels can be effected. In addition, the movement of the drivewheels is restricted by the linkage to the central steering unit.

U.S. Pat. No. 4,444,287 (Voelz) discloses a steering system for a mobile crane, in which each wheel is independently pivotable (steerable) such that any arrangement of the drivewheels is achievable. However, each drivewheel requires separate, independent mechanisms for pivoting and for driving the wheel.

Therefore, the mechanical portions of the steering mechanisms for these prior art devices are necessarily quite intricate and complex. Although the inclusion of such separate and additional drives and transmissions increase the maneuverability of the wheeled chassis, these additional drives and transmissions also add appreciably to the production and maintenance costs of these devices.

OBJECTS OF THE INVENTION

It is an object of the present invention to provide a drivewheel assembly having a simplified arrangement for independently pivoting the drivewheels of a wheeled chassis, such as a motorized wheelchair.

It is a further object of the present invention to provide such a drivewheel assembly which pivots under power applied to the drive wheel such that no dedicated positioning drives are required.

It is a further object of the present invention to provide such a drivewheel assembly with a drivewheel and a controller for controlling the pivoting of the drivewheel to a specific orientation to enable movement of the wheeled chassis in a specific direction.

It is still a further object of the invention to provide a pushbutton controller which is programmed for automatically pivoting the drivewheel of the inventive drivewheel assembly to a specific predefined orientation in response to activation of a particular one of a plurality of provided buttons.

SUMMARY OF THE INVENTION

A drivewheel assembly for a wheeled chassis, such as a motorized wheelchair, includes a drivewheel which is pivotably mounted on a kingpin to a frame the wheeled chassis. The drivewheel is offset from the axis of the kingpin. The kingpin is also selectably disengagable from the frame so that when the kingpin is disengaged and the drivewheel is rotated, the drive assembly pivots about the rotational axis of the kingpin. When the kingpin is engaged with the frame, the same rotation of the drivewheel causes the wheeled chassis to move, without reorientation of the wheel. No additional linkages, transmissions, or motors are required to selectively alter the orientation or position of the drivewheel.

Thus, disclosed in accordance with a preferred embodiment of the present invention, is a drive assembly for moving and controlling a direction of movement of a wheeled chassis, such as a motorized wheelchair, comprising a kingpin having an axis of rotation and rotatably mounted on a frame of the wheeled chassis, the axis of rotation being substantially perpendicular to a ground surface on which the wheeled chassis rests. The assembly further indicates a drive wheel rotatably connected to the kingpin with a center of rotation of the drive wheel being offset from the kingpin axis of rotation, and a drive motor drivingly connected for rotating said drive wheel. The kingpin is selectively latchably connected to the frame, and the drive motor is operable to pivot the drive assembly about the kingpin axis of rotation by rotating the drive wheel when the kingpin is unlatched from the frame.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 3 is an elevated perspective view of a latch assembly for use on the latch plate to capture the lock pin as the latch plate and drive assembly are rotated;

DETAILED DESCRIPTION OF THE PRESENTLY PREFERRED EMBODIMENTS

The present invention is directed to an independently pivotable drivewheel for a wheeled chassis such as a motorized wheelchair. The wheeled chassis may, by way of example, comprise the wheeled chassis disclosed in U.S. Pat. No. 5,547,038, the entire contents of which are expressly incorporated herein by reference. Of course, instead of the wheeled chassis disclosed in U.S. Pat. No. 5,547,038 it should be understood that the wheeled chassis may be constructed to include a frame of any suitable shape, including ovoids, as may be necessary or appropriate for a particular application. In addition, one skilled in the art will be able to select the proper materials for the frame which may include, by way of non-limiting example, steel, hard plastics, wood, depending on the particular structure and the application involved.

Figure 1:
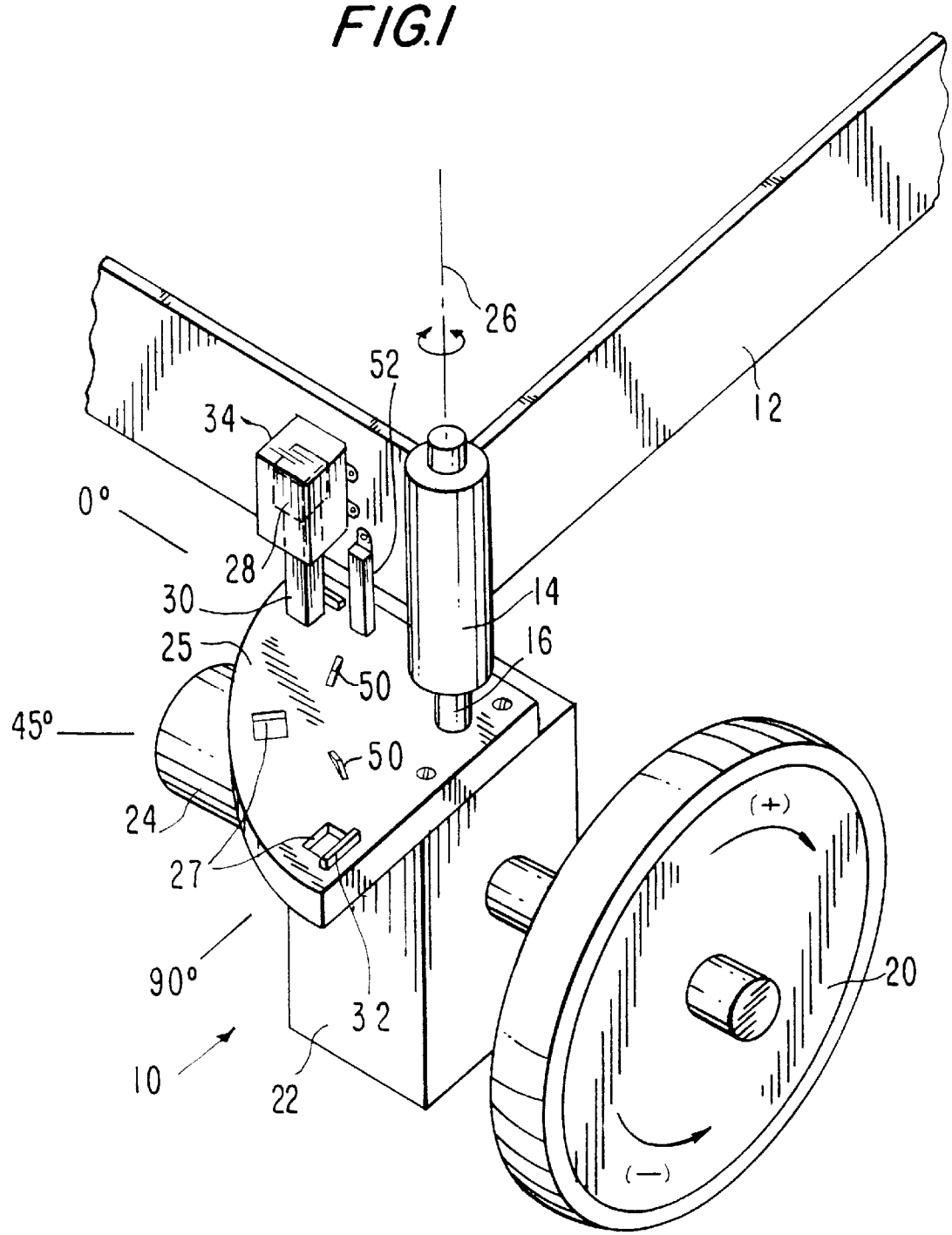
FIG. 1 is a perspective view of a drive assembly of the invention including a drivewheel and a latch plate for a wheeled chassis.

Referring to FIG. 1, a drivewheel assembly 10 in accordance with the invention and including a drivewheel 20, a gearbox 22, and a variable speed, bidirectional drive motor 24 is pivotally mounted on a frame 12 of a wheeled chassis, only a portion of the frame 12 of which is shown in the drawings. The drive motor 24 may be geared to the drive wheel 20 using any type of known gear assemblies (e.g. a differential). The drivewheel assembly is connected to the frame 12 by a kingpin 16 which is inserted into and for axial rotation relative to a channel 14 fixedly connected to the frame 12. Channel 14 may incorporate a bearing assembly (not shown) that enhances freedom of selectively controlled pivotal axial rotation of the kingpin 16 and assembly 10 about an axis of rotation 26 defined substantially normal to the underlying or supporting ground surface upon which the drivewheel 20 rests.

A latch plate 25 is fixedly secured to the drive assembly 10 so that the latch plate 25 is pivotable with the drive assembly 10 about the axis of rotation 26. A solenoid housing 34 enclosing a solenoid 28 and an outwardly projecting armature comprising a lock pin 30 is mounted on the frame 12. The latch plate 25 includes a plurality of latch openings or holes 27 at predetermined locations on the latch plate 25. The latch holes are aligned with the lock pin 30 for engagement of the lock pin 30 with each of the latch holes 27 for retaining the drive assembly 10 at fixed orientations or positions with respect to the frame 12. The positions of the latch holes 27 shown, by way of example, in FIG. 1 are 0 degrees, 45 degrees, and 90 degrees. Nevertheless, other and/or additional positions may be added or substituted depending on the steering functions required or desired for the particular wheeled chassis with which the invention drivewheel assembly is employed.

In lieu of latch holes 27, other types of receptacles such as notches or indentations or gates or the like defined or disposed in the side of the latch plate 25 may be provided, in which case the lock pin 30 will move horizontally to engage with and/or disengage from the notches or like structures.

To operatively change the orientation or position of the drive assembly 10, lock pin 30 is disengaged from the latch hole 27 that it engagedly occupies. The motor 24—which is the same motor that is used or operated to rotate the drivewheel 20 to selectively move the wheeled chassis along the supporting ground surface—is then driven to rotate the drivewheel 20. Since the plane of rotation of the drivewheel 20 is offset from the axis of rotation 26 and because the latch plate 25 is no longer held by the latch pin 30 in a fixed position relative to the frame 12, the resulting rotation of the drivewheel 20 in (for example) the negative (−) direction, (FIG. 1) causes the entire drive assembly 10 to rotate about the axis 26 and relative to the frame 12 in the clockwise direction until the lock pin 30 engages the next or another latch hole 27 or abuts a stop 32 mounted on the latch plate 25. The stops 32, located at the edge of the latch plate 25 in the embodiment of FIG. 1, limit the attainable rotation of the drive assembly 10 about the axis of rotation 26. The rotation of the drivewheel 20 in the positive (+) direction, with the lock pin 30 disengaged from the proximate latch hole 27, similarly effects the rotation of the drive assembly 10 about axis 26 but in the counterclockwise direction.

The latch plate 25 further comprises cam or guide surfaces 50 which actuate a microswitch 52 connected to the frame 12 as drive assembly 10 rotates about the axis of rotation 26. The microswitch 52 generates a signal that is transmitted to a controller (described herein below) to indicate to the controller that the next latch hole 27 is being approached. If the next latch hole 27 corresponds to the desired final position or orientation of drive assembly 10, then solenoid 28 releases lock pin 30 in response to the signal generated by microswitch 52 so as to retain drive assembly 10 in its new position until another chance in orientation is initiated by the user. If the location of the next latch hole 22 is not the desired position of the drive assembly on the other hand, then the solenoid 28 maintains the disengaged or raised position of the lock pin 30 as the assembly 10 carries the lock pin beyond that latch hole 27.

Instead of cam surfaces 50 and microswitches 52, the surface of the latch plate may alternately carry or bear indicia that are readable by an associated sensing device, thereby potentially enabling attainment of a more precise control of the orientation or position of the drive assembly. In that modified embodiment, the solenoid 28 is operatively released in response to signals from the sensing device which indicate that the desired location is being approached or has been reached.

Figure 8:
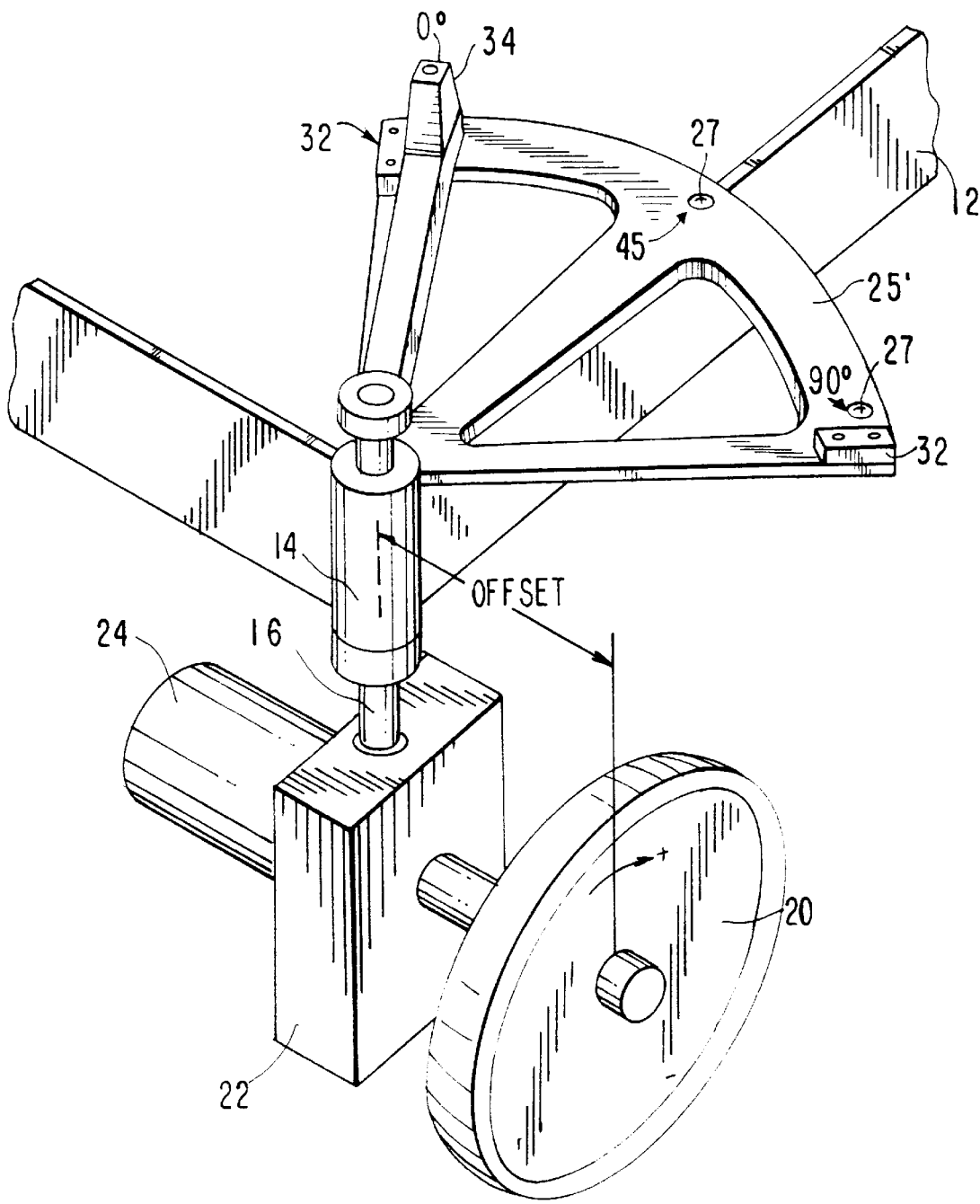
FIG. 8 is a perspective view of a further embodiment of the drive assembly of the invention.

In an alternative embodiment shown in FIG. 8, a latch plate 25' may be connected to the frame 12 of a wheeled chassis instead of the drivewheel assembly 10. In this alternative embodiment, the solenoid housing 34 is connected to an arm 72 radially extending from the kingpin 16 of the drivewheel assembly 10 so that as the drivewheel assembly 10 pivots, the solenoid housing 34 swings across the latch plate 25' for selectively engaging latch holes 27 on the stationary latch plate 25'. In FIGS. 1 and 8, the solenoid housing 34 is shown as vertically actuating a lock pin for engaging the latch plate 25 or 25'. However, the solenoid housing 34 may also horizontally actuate the lock pins 30 for engaging receptacles 27 or may actuate the lock pins 30 via a linkage.

Figure 2A:
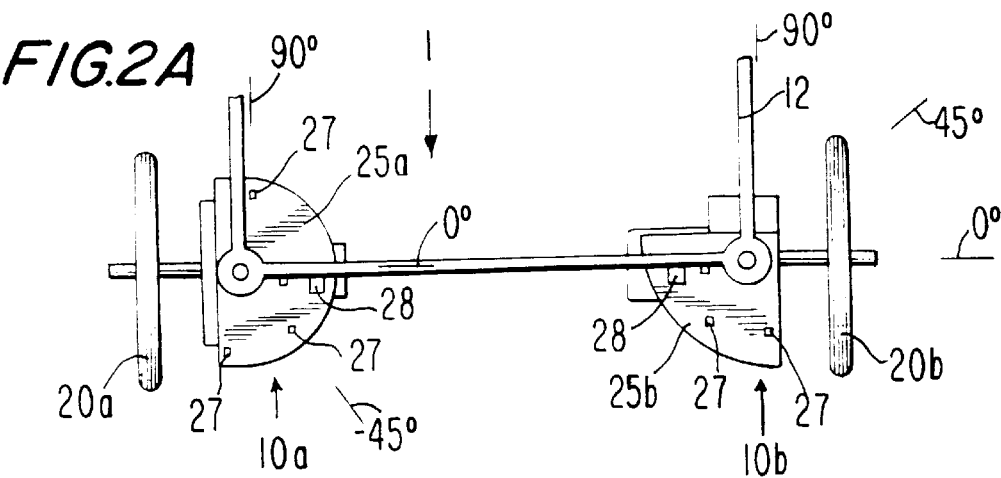
FIGS. 2A, 2B, 2C, and 2D are top plan views of various orientations of right and left drivewheels of the wheeled chassis.

Referring now to FIGS. 1 and 2A, a portion of a wheeled chassis 1 including the frame 12 is shown with a left drive assembly 10a and a right drive assembly 10b. The right drive assembly 10b includes a latch plate 25b which corresponds to the latch plate 25 shown in FIG. 1. Thus, the right latch plate 25b has latch holes 27 positioned at 0 degrees, 45 degrees, and 90 degrees. Similarly, the left drive assembly 10a has a left latch plate 25a including latches 27 positioned at −45 degrees, 0 degrees, and 90 degrees. When both drive assemblies 10a and 10b are at their respective 0 degree positions, as shown in FIG. 2A, drivewheels 20a and 20b are positioned for travel of the chassis along the ground surface in the forward and/or reverse directions. If the speed at which left drivewheel 20a is rotated is different than that of right drivewheel 20b, then the wheeled chassis 1 will turn as it moves along the supporting surface; the degree of the turn will depend on the difference in rotational speed between the two drivewheels 20a, 20b.

Figure 2B:
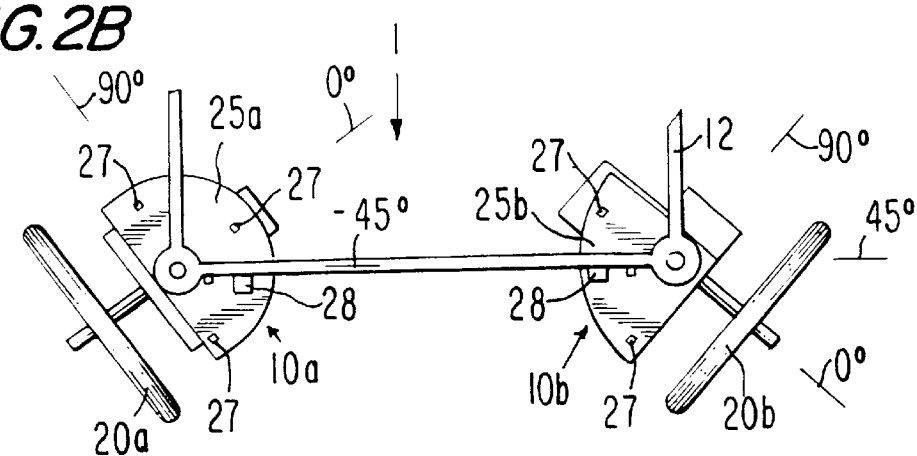
Figure 2C:
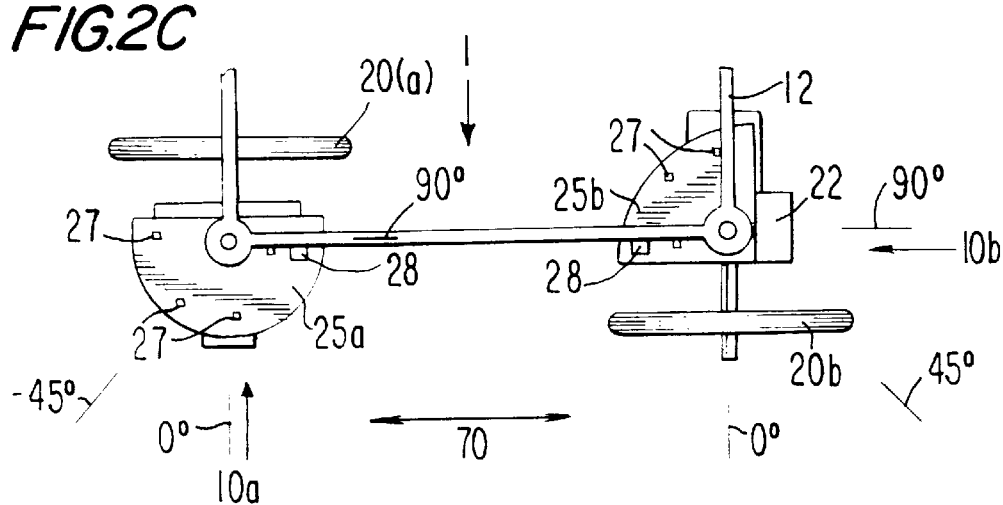
Figure 2D:
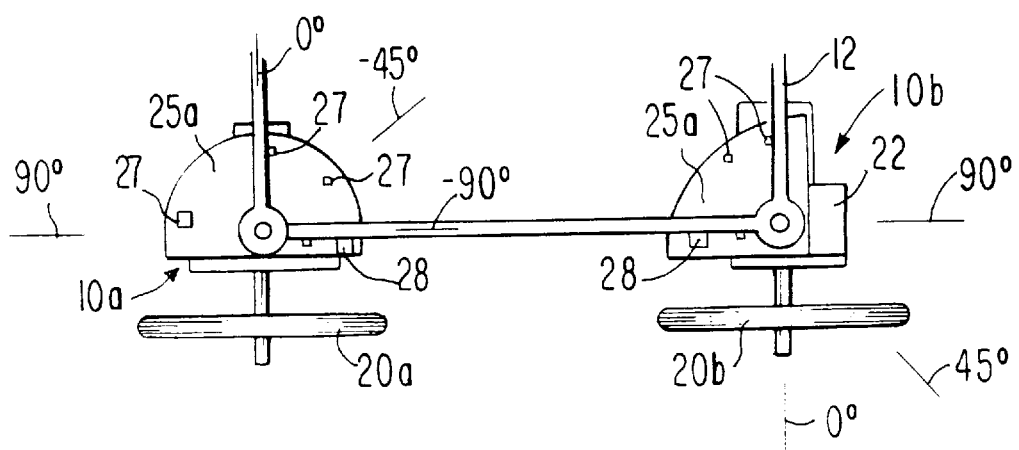

Referring now to FIG. 2B, when the left drive assembly 10a is positioned at an orientation of −45 degrees and the right drive assembly 10b is positioned at an orientation of 45 degrees, the drivewheels 20a and 20b are positioned for rotating the frame 12 in place, assuming (by way of example) that the frame 12 is substantially square. If frame 12 is not square then an angle other than 45 degrees must be used as a function of the shape of frame 12 to attain the same motion. In the mode depicted in FIG. 2B, the controller (described herein below) reverses the drive direction of one of the drivewheels 20a and 20b such that the forward and reverse movements of the controller rotate the wheeled chassis 1 in a clockwise and counter clockwise direction, respectively. Referring now to FIG. 2C, for lateral or sideways movement of frame 12 the left drive assembly 10a is oriented at 90 degrees and the right drive assembly 10b at 90 degrees so that like rotation of drivewheels 20a and 20b causes the wheeled chassis 1 to move in the direction of the arrow 70. Since the drivewheels 20a ad 20b are offset in the operating condition shown in FIG. 2C, any differential in the speed of rotation of left drivewheel 20a and right drivewheel 20b will cause the wheeled chassis 1 to turn slightly from the true lateral direction, the degree of the turn being controllable through relative variation of the differential in speed. Although the preferred embodiment herein disclosed accommodates three orientations of each of the drive assemblies 10a and 10b, other and/or additional orientations can be added or substituted as a function of a specific application. For instance, left latch plate 25b may include an additional latch hole 27 located at −90 degrees for aligning left drivewheel 20b with right drivewheel 20a when right drivewheel 20a is at its 90 degree position; this configuration is shown in FIG. 2D. When the drivewheels 20a and 20b are aligned in the manner shown in FIG. 2D, and the relative speed of the drivewheels 20a and 20b is kept essentially equal, true lateral motion of the frame 12 and chassis along the underlying ground or support surface is attained. As in FIG. 2B, the controller automatically reverses the drive direction for one of drive wheels 20a and 20b in the mode depicted in FIG. 2D, for laterally moving the wheeled chassis.

Figure 4:
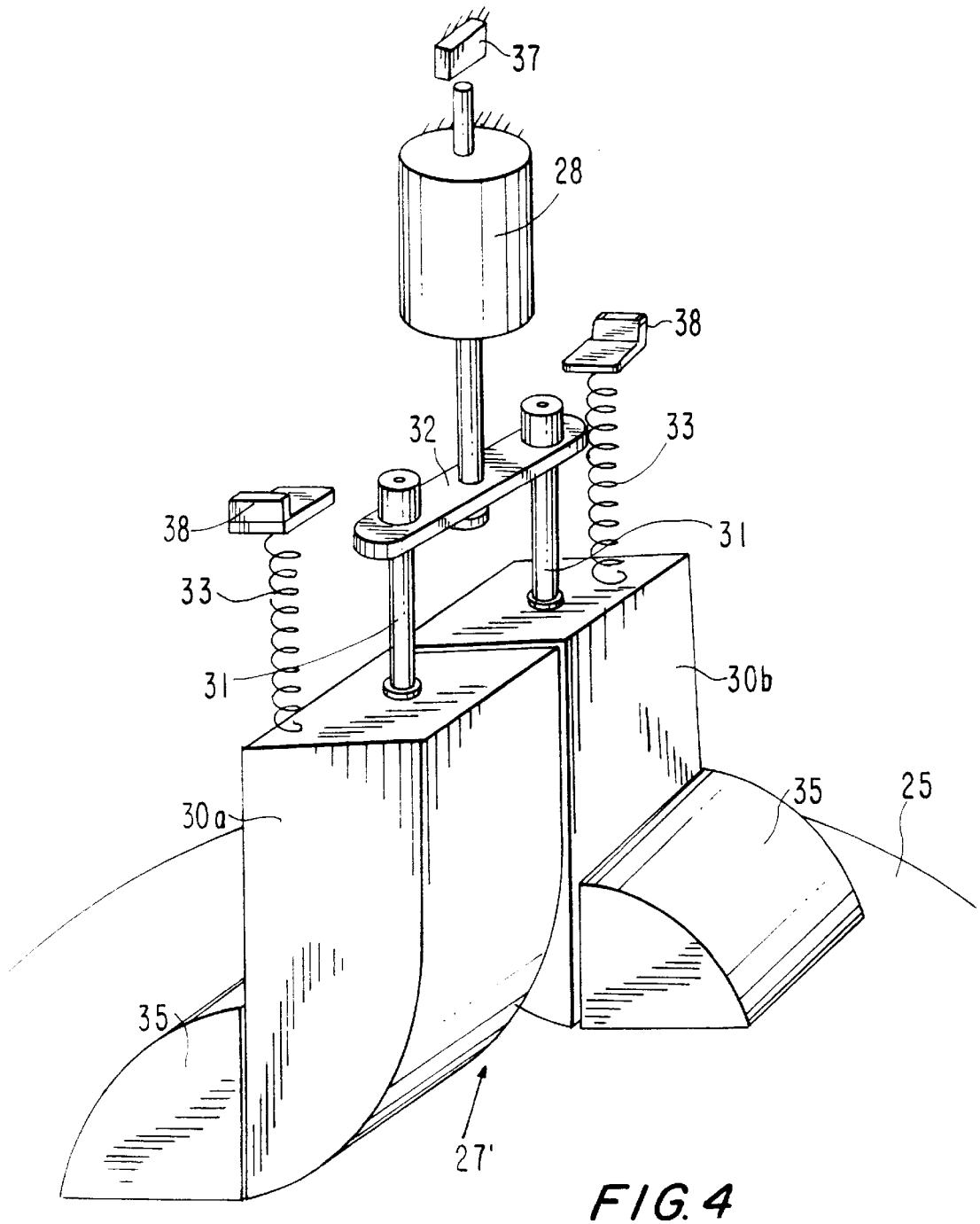
FIG. 4 depicts additional details of the latch assembly of FIG. 3.

With reference now to FIGS. 3 and 4, another embodiment for retaining the inventive drive assembly 10 at a fixed orientation relative to the frame 12 is there depicted. Instead of latch holes 27, the latch plate 25 of FIGS. 3 and 4 carries or includes latch mechanisms 27' for capturing lock pin 30 as it approaches from either direction. Each latch mechanism 27' includes two latch stops 35 aligned with corresponding lock pins 30a and 30b of a solenoid 28'. The latch stops 35 are offset such that when lock pins 30a and 30b are in a latched position (as shown in FIG. 4), one latch stop 35 is located in front of one lock pin 30a and the other latch stop 35 lies behind the other lock pin 30b. Each of the lock pins 30a and 30b and latch stops 35 has a tapered side and a non-tapered side configured and arranged so that when in the latched position, the non-tapered sides meet. Lock pins 30a and 30b are normally maintained in the downward position by springs 33 mounted on spring supports 38 in solenoid housing 34, thus retaining the lock pins 30a and 30b in place between the latch stops 35.

Within solenoid housing 34, the reciprocating shaft of the solenoid 28' is connected proximate its free end to a plate 32. Each of the lock pins 30a and 30b includes a rod 31 extending from its upper end and connected to plate 32. When solenoid 28' is energized, the two lock pins 30a and 30b are concurrently lifted via plate 32 and rods 31. A microswitch 37 may be mounted in the solenoid housing to verify that the lock pins 30a and 30b are lifted high enough to permit reorienting of the drive wheel assemblies 10. When solenoid 28' is subsequently deenergized, springs 33 urge lock pins 30a and 30b toward and into the downward position.

Figure 5:
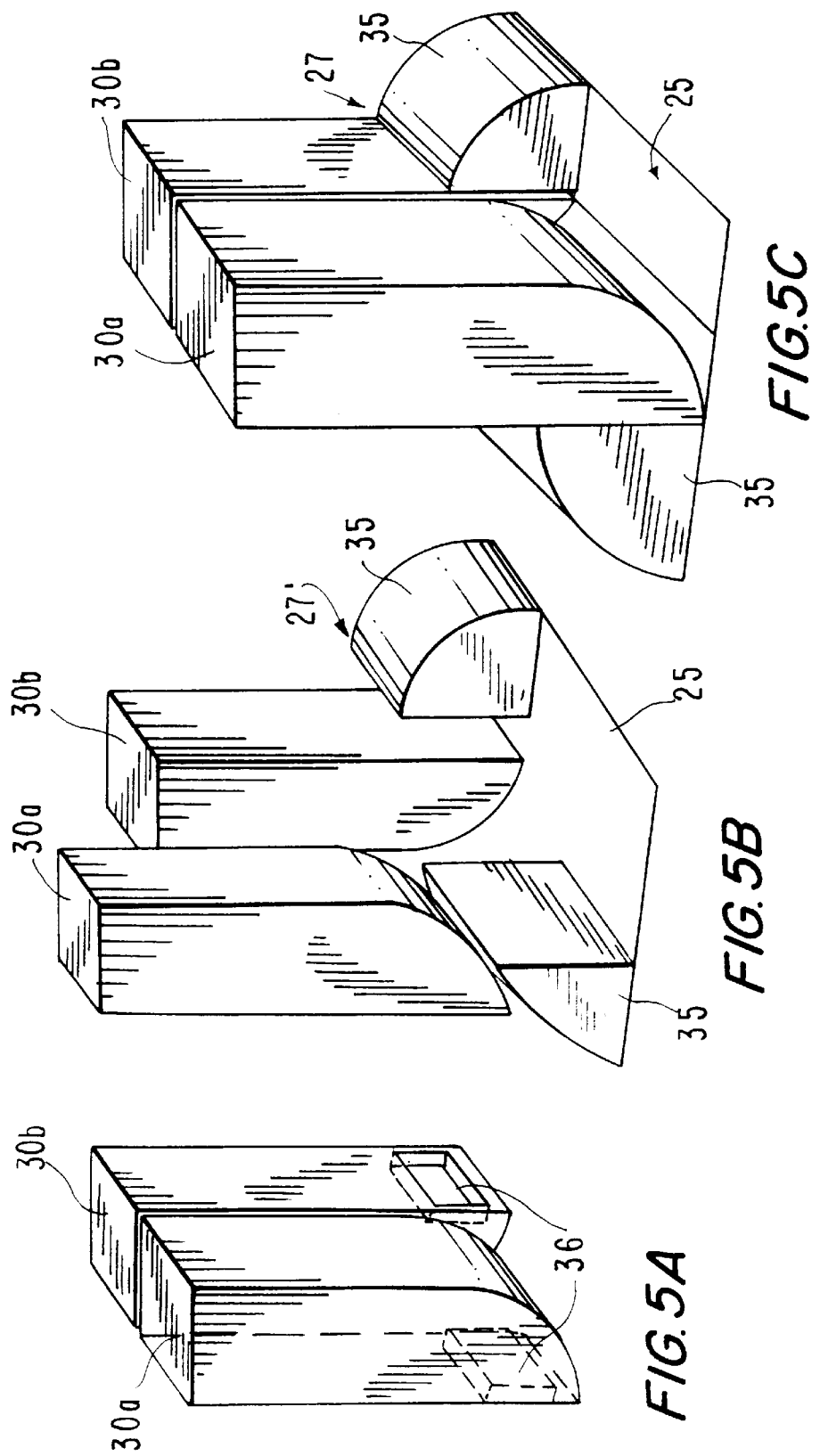
FIGS. 5A, 5B, and 5C show the positions of the lock pin in the latch assembly of FIG. 3 as the latch assembly approaches the lock pin and the lock pin engages into the latch.

Referring now to FIGS. 5A, 5B, and 5C, lock pins 30a and 30b may include integral microswitches 36 to detect when the lock pins 30a and 30b are in the latched position. As the latch plate 25 is rotated and lock pins 30a and 30b are relatively advanced toward latch mechanism 27', the tapered side of lock pin 30a will encounter the tapered side of a corresponding latch stop 35. When the tapered sides meet, lock pin 30a slides over the corresponding latch stop 35. The tapered edges press lock pin 30a upward against the urgency of spring 33, as shown in FIG. 5B. When the latched position is reached, as shown in FIG. 5C, the lock pin 30a which was pushed up clears latch stop 35 and is urged into the downward position by spring 33 to latch the drive assembly 10 in place. If, on the other hand, the latch mechanism 27' is approached from the opposite side, lock pin 30b similarly encounters the latch stop 35.

Figure 6:
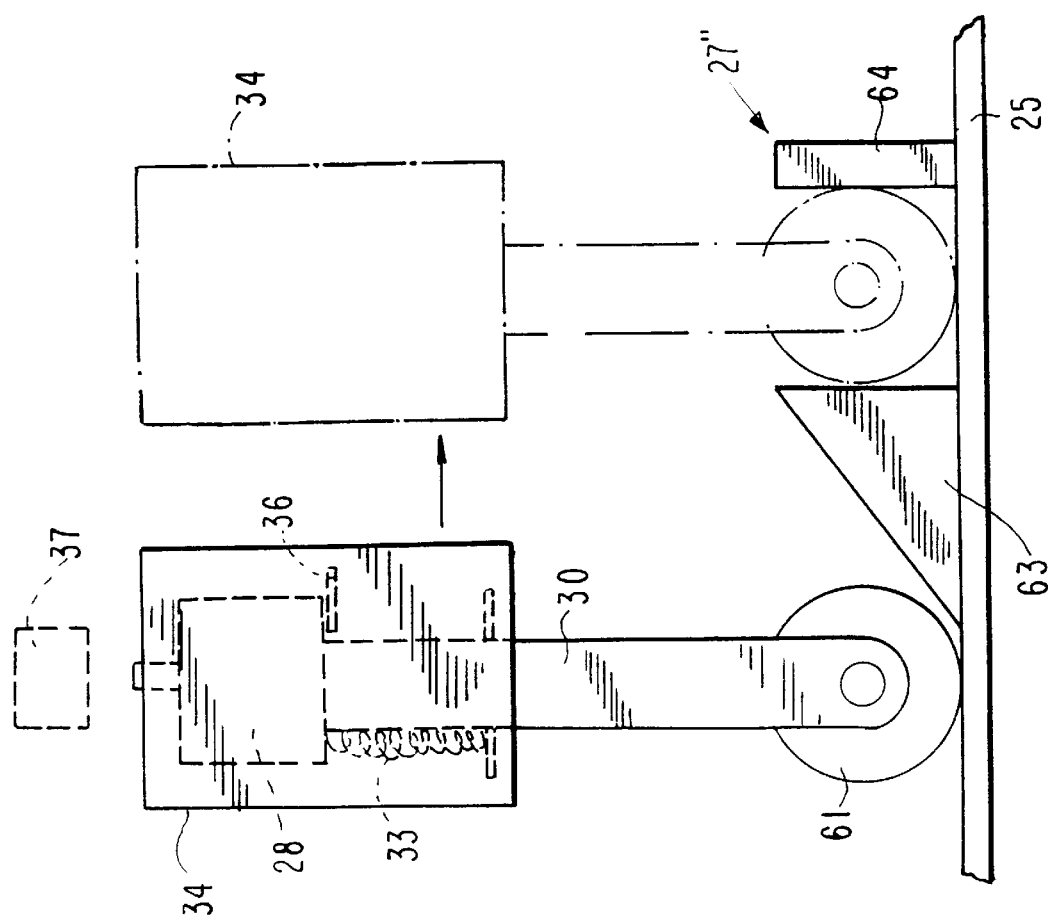
FIG. 6 depicts an alternate form of the lock pin and the latch plate.

In the further embodiment of the latching lock pin 30, illustrated in FIG. 6, the solenoid 28 is operatively connected to the lock pin 30 so that when the solenoid 28 is energized, the lock pin 30 is pulled up or retracted against the urgency of spring 33 to enable the lock pin 30 to pass over a latch mechanism 27". When the solenoid 28 is deenergized, a roller carries for freewheeling rotation on the end of the shaft of lock pin 30 is urged by spring 33 against the latch plate 25 until it approaches the latch mechanism 27", where it moves upward along a ramp 63 of latch mechanism 27" against the urgency of spring 33. At the peak of ramp 63, a sensor 36 (located, in this embodiment, in the solenoid housing 34) or a microswitch 37 (located at the top of solenoid housing 34) is activated to discontinue supply of operating power to the motor of drive wheel 20. At that instant, the lock pin 30 enters a space defined between the ramp 63 and a blocking wall 64 on latch mechanism 27", thereby latching lock pin 30 in place as shown in dotted lines in FIG. 6. The sensor 36 or microswitches 37 is also used when the solenoid 28 is initially energized for verifying that the lock pin 30 is sufficiently raised to initiate reorientation of the drive wheel assembly 10. The preferred inclusion of roller 61 reduces friction as the lock pin 30 is advanced or displaced along latch plate 25 and latch mechanism 27". In addition, instead of blocking wall 64, the latch mechanism 27" may alternately include a second, oppositely-inclined ramp so that lock pin 30 is latchable when approaching the latch mechanism 27" from either direction. In addition, a lock pin 30 including an end-mounted roller 61 may be used with the latch holes 27 of FIG. 1 instead of the latch mechanism 27" of FIG. 6.

Figure 7:
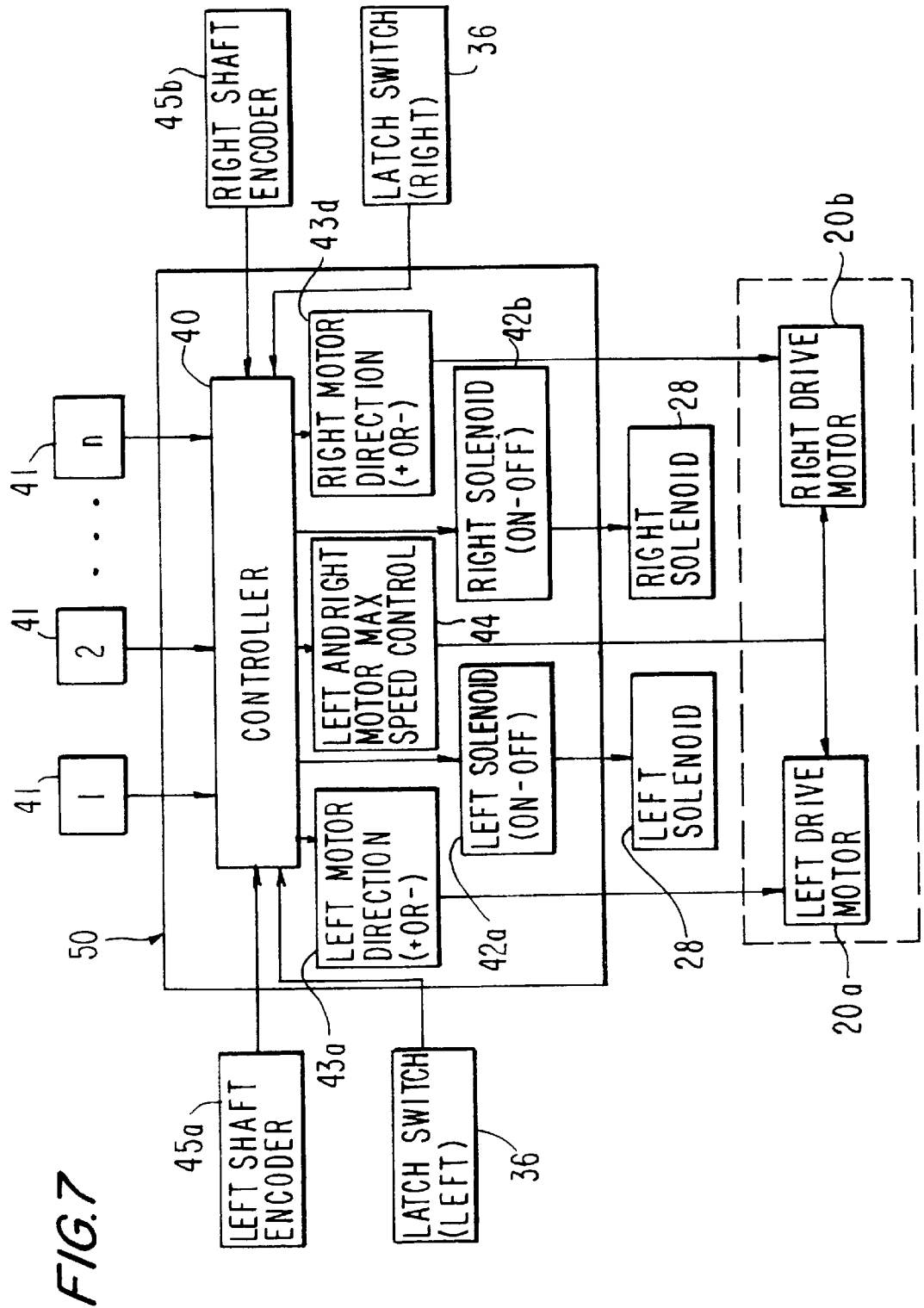
FIG. 7 is a block diagram of a control circuit for a wheeled chassis in accordance with the invention.

FIG. 7 depicts a control system 50 for a wheeled chassis in accordance with the invention and is particularly suitable where the wheeled chassis comprises or supports a motorized wheel chair. At the center of control system 50 is a programmable controller 40. Controller 40 may be of any suitable type but is preferably i microprocessor. Controller 40 receives input signals from a variety of mode buttons 41. Mode buttons 41 are selectively depressed or actuated by the operator of the wheeled chassis to initiate a function that the user wishes the wheeled chassis 1 to perform, such as to move forward, move backward, move left laterally, move right laterally, rotate in a clockwise direction, rotate in a counterclockwise direction, etc. Indicators such as lights may be operatively connected to the mode buttons 41 for indicating the current functioning mode of the wheeled chassis 1. Also connected to processor 40 are left and right solenoid switches 42a and 42b for activating solenoids 28, and left and right drivewheel direction switches 43a and 43b for determining a direction of rotation of drive motors 24 in response to actuation of particular ones of the mode buttons 41. A speed control 44 is also connected between processor 40 and drive motors 24, and may take the form of a joystick which is used by the operator of the wheeled chassis to control motion thereof along a support surface. The joystick permits speed control from zero to a predetermined maximum with the ability to individually control the rotational rate or speed of the left drivewheel 20a and the right drivewheel 20b, thus permitting user steering of the wheeled chassis 1 as described above. The speed control 44 may employ any conventional method, such for example as pulse length modulation in which the longer pulses provide more power to the drive motors 24.

A left shaft encoder 45a and a right shaft encoder 45b are also connected to the processor 40. The left and right shaft encoders 45a, 45b are mounted on the respective kingpins 16 to operatively track the amount of rotation of each kingpin 16. The output of microswitches 36 in bolts lock pins 30a and 30b is also connected to controller 40.

The control system of the present invention operates as follows. When one of the mode buttons 41 is depressed by the user, controller 40 determines the necessary positions of the drivewheels to accomplish the intended motion. Controller 40 compares that position to the present position of the drivewheels, and then determines the direction and amount of rotative reorientation of the drivewheels required to place the drivewheels in the desired position. The solenoids 28 are activated to raise the lock pins 30; raising of the lock pins 30 to a position sufficient to accommodate reorientation of the drive wheel assemblies 10 is verified by monitoring of the state of the microswitch 36 (or 37 in the embodiment of FIG. 6). Drivewheel drive motors 24 are then activated so that the entire drive assembly 10 connected to each kingpin 16 rotates toward the desired position. As the latch plate 25 of each drive assembly 10 approaches the target latch position, and after passing any intervening latch positions, the respective solenoid 28 is deactivated to lower the lock pin 30. When microswitches 36 or 37 indicate that the lock pins 30 are in their latched positions, the supply of power to the motor 24 of drivewheels 20 is discontinued. The user can now selectively activate the motors 24 to rotate the reoriented drivewheels and thereby maneuver the wheeled chassis 1 in the selected mode.

While there have been shown and described and pointed out fundamental novel features of the present invention as applied to preferred embodiments thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. In a wheeled chassis having a frame and a drive wheel for powered rotation to operatively move the fame and chassis in a user-controllable direction along an underlying supporting surface, the improvement comprising a drive wheel assembly connecting the frame and drive wheel and comprising:

a motor connected to the drive wheel and selectively operable for rotating the drive wheel about a central axis of the drive wheel to cause movement of the drive wheel on and relative to the underlying supporting surface, the drive wheel defining a plane of rotation substantially perpendicular to the central axis;

means mounting said motor to the frame for pivotal rotation of the motor relative to the frame about an orienting axis extending substantially perpendicular to the drive wheel central axis and offset from the plane of rotation so that said pivotal rotation of the motor relative to the frame effects reorientation of the drive wheel for changing the direction in which the frame and chassis is movable along the underlying supporting surface when the drive wheel is operatively rotated about said central axis; and mode control means connected to one of the frame and said motor mounting means and selectively operable in a first mode positionally fixing said motor to the frame so as to prevent said pivotal rotation of the motor about said orienting axis and thereby maintain a current orientation of the drive wheel such that operation of said motor to rotate the drive wheel in said first mode of the mode control means causes movement of the frame and chassis along the underlying ground surface in a direction determined by said current orientation of the drive wheel, and in a second mode permitting freewheeling pivotal rotation of the motor about said orienting axis such that operation of said motor to rotate the drive wheel in the plane of rotation in said second mode of the mode control means causes concurrent pivotal rotation of the motor about said orienting axis so as to reorient the drive wheel as a result of an response to the operation of the motor and thereby change the direction in which the frame and chassis are movable along the underlying ground surface through operation of the motor in said second mode of the mode control means.

2. In a wheeled chassis in accordance with claim 1, said mode control means comprising an actuator operatively movable between a first position positionally locking said motor to the frame to define said first mode, and a second position decoupling the mode control means from said motor to define said second mode.

3. In a wheeled chassis in accordance with claim 1, said mode control means comprising a member operatively movable between a first position in which said member engages the other of the frame and said motor mounting means for positionally locking said motor mounting means and said motor to the frame to define said first mode, and a second position in which said member is disengaged from the other of the frame and said motor mounting means so as to permit said freewheeling pivotal rotation of the motor about said orienting axis and define said second mode.

4. In a wheeled chassis in accordance with claim 3, wherein said mode control mean is connected to the frame.

5. In a wheeled chassis in accordance with claim 4, said motor mounting means comprising a latch plate to which said motor is mounted, and said member operatively movable between said first position in which the member engages the latch plate and said second position in which the member is retracted from said latch plate.

6. In a wheeled chassis in accordance with claim 5, said latch plate comprising a plurality of receptacles, each configured for receiving said member in said first position of the member, and defined at predetermined locations along said latch plate.

7. In a wheeled chassis in accordance with claim 4, wherein rotation of the drive wheel about said central axis defines a plane of rotation of the drive wheel, said orienting axis being offset from the plane of rotation of the drive wheel.

8. In a wheeled chassis in accordance with claim 4, said mode control means comprising a solenoid and said member comprising a operatively movable plunger of the solenoid.

9. In a wheeled chassis in accordance with claim 1 wherein the frame includes a collar, said motor mounting means comprising a shaft journaled through for rotation relative to the frame collar and extending along said orienting axis.

10. A drive wheel assembly for connecting a frame of a wheeled chassis to a drive wheel having a central axis and operable for applying rotative forces to the drive wheel to operatively move the frame and chassis in a user-controllable direction along an underlying supporting surface and for selectively reorienting the drive wheel to vary the direction of movement of the frame and chassis along the supporting surface, said drive wheel assembly comprising:

a motor connectable to the drive wheel and selectively operable for rotating the drive wheel about the central axis of the drive wheel to cause movement of the drive wheel on and relative to the underlying supporting surface, the drive wheel defining a plane of rotation substantially perpendicular to the central axis;

means for mounting said motor to the frame for pivotal rotation of the motor relative to the frame about an orienting axis extending substantially perpendicular to the drive wheel central axis and offset from the plane of rotation so that said pivotal rotation of the motor relative to the frame effects reorientation of the drive wheel for changing the direction in which the frame and chassis is movable along the underlying supporting surface when the drive wheel is operatively rotated by the motor about the central axis of the drive wheel; and mode control means for connection to one of the frame and said motor mounting means and selectively operable in a first mode positionally fixing said motor to the frame so as to prevent said pivotal rotation of the motor about said orienting axis and thereby maintain a current orientation of the drive wheel such that operation of said motor to rotate the drive wheel in said first mode of the mode control means causes movement of the frame and chassis along the underlying ground surface in a direction determined by said current orientation of the drive wheel, and in a second mode permitting freewheeling pivotal rotation of the motor about said orienting axis such that operation of said motor to rotate the drive wheel in the plane of rotation in said second mode of the mode control means causes concurrent pivotal rotation of the motor about said orienting axis so as to reorient the drive wheel as a result of and in response to the operation of the motor and thereby change the direction in which the frame and chassis are movable along the underlying ground surface through operation of the motor in said second mode of the mode control means.

11. A drive wheel assembly in accordance with claim 10, wherein said mode control means comprises an actuator operatively movable between a first position positionally locking said motor to the frame to define said first mode, and a second position decoupling the mode control means from said motor to define said second mode.

12. A drive wheel assembly in accordance with claim 10, wherein said mode control means comprises a member operatively movable between a first position in which said member engages the other of the frame and said motor mounting means for positionally locking said motor mounting means and said motor to the frame to define said first mode, and a second position in which said member is disengaged from the other of the frame and said motor mounting means so as to permit said freewheeling pivotal rotation of the motor about said orienting axis and define said second mode.

13. In a wheeled chassis in accordance with claim 12, wherein said mode control mean is connected to the frame.

14. A drive wheel assembly in accordance with claim 13, wherein said motor mounting means comprises a latch plate to which said motor is mounted, and wherein said member is operatively movable between said first position in which the member engages the latch plate and said second position in which the member is retracted from said latch plate.

15. A drive wheel assembly in accordance with claim 14, wherein said latch plate comprises a plurality of receptacles, each configured for receiving said member in said first position of the member, and defined at predetermined locations along said latch plate.

16. A drive wheel assembly in accordance with claim 12, wherein rotation of the drive wheel about the central axis defines a plane of rotation of the drive wheel, said orienting axis being offset from the plane of rotation of the drive wheel.

17. A drive wheel assembly in accordance with claim 12, wherein said mode control means comprises a solenoid and said member comprises a operatively movable plunger of the solenoid.

18. A drive wheel assembly in accordance with claim 11, wherein the frame includes a collar, and wherein said motor mounting means comprises a shaft journaled through for rotation relative to the frame collar and extending along said orienting axis.

19. A drive wheel assembly for connection to a frame of a wheeled chassis supported for movement on and along an underlying supporting surface, comprising:

a drive wheel having a central axis and being rotatable in a plane of rotation substantially perpendicular to the central axis;

a motor connected to the drive wheel and selectively operable for rotating the drive wheel about said central axis to cause movement of the frame and chassis in a user-controllable direction along the underlying supporting surface and for selectively reorienting the drive wheel to vary the direction of movement of the frame and chassis along the supporting surface;

means for mounting said motor to the frame for pivotal rotation of the motor relative to the fame about an orienting axis extending substantially perpendicular to the drive wheel central axis and offset from the plane of rotation so that said pivotal rotation of the motor relative to the frame effects reorientation of the drive wheel for changing the direction in which the frame and chassis is movable along the underlying supporting surface when the drive wheel is operatively rotated by the motor about the central axis of the drive wheel; and mode control means for connection to one of the frame and said motor mounting means and selectively operable in a first mode positionally fixing said motor to the frame so as to prevent said pivotal rotation of the motor about said orienting axis and thereby maintain a current orientation of the drive wheel such that operation of said motor to rotate the drive wheel in said first mode of the mode control means causes movement of the frame and chassis along the underlying ground surface in a direction determined by said current orientation of the drive wheel, and in a second mode permitting freewheeling pivotal rotation of the motor about said orienting axis such that operation of said motor to rotate the drive wheel in the plane of rotation in said second mode of the mode control means causes concurrent pivotal rotation of the motor about said orienting axis so as to reorient the drive wheel as a result of and in response to the operation of the motor and thereby change the direction in which the frame and chassis are movable along the underlying ground surface through the operation of the motor in said second mode of the mode control means.

* * * * *